United States Patent [19]
Meyer

[11] 3,751,812
[45] Aug. 14, 1973

[54] MEASURING APPARATUS
[75] Inventor: Franz-Josef Meyer, Opladen, Germany
[73] Assignee: Goetzewerke Friedrich Goetze, Burscheid, Germany
[22] Filed: May 19, 1971
[21] Appl. No.: 144,785

[30] Foreign Application Priority Data
May 20, 1970 Germany............... P 20 24 461.5

[52] U.S. Cl............. 33/178 R, 33/174 R, 33/174 Q
[51] Int. Cl............................ G01b 5/08, G01b 5/00
[58] Field of Search ..................... 33/174 R, 174 L, 33/178 R, 174 Q

[56] References Cited
UNITED STATES PATENTS
1,196,789  9/1916  Koelpin............................ 33/174 R
2,689,082  9/1954  Kolisch............................ 33/174 L Primary Examiner—Robert B. Hull
Assistant Examiner—Richard R. Stearns
Attorney—Spencer & Kaye

[57] ABSTRACT

Apparatus for measuring the outer diameter and ovality of out-of-round articles has a first defined axis of movement and first displaceable means mounted for movement along that axis, a second defined axis of movement different from the first axis and second displaceable means mounted for movement along the second axis. A counterjaw is mounted on the first displaceable means for movement therewith and cooperates with a separate pivotally mounted jaw. The pivotally mounted jaw and the separate counterjaw are arranged for measuring the ovality of an out-of-round article to be measured. A jaw is mounted on a second displaceable means for movement therewith and cooperates with a fixed jaw for measuring the outer diameter of the article to be measured. A member is mounted on the first displaceable means which defines a surface inclined at 45° with respect to the second axis. Means having a sensing tip is mounted on the first displaceable means and arranged perpendicularly with respect to and in contact with the inclined surface for measuring the ovality of the article to be measured.

7 Claims, 6 Drawing Figures

MEASURING APPARATUS

BACKGROUND OF THE INVENTION

The present invention relates to apparatus particularly suited for measuring out-of-round articles such as so-called synchronizing rings which produce synchronism between a clutch sleeve and a gear before engagement of the jaw clutches in motor vehicle transmissions. In the installed state, in which the rings are measured, their gap exhibits a certain play. The ovality of piston rings may also be measured and is determined in a tensioned band after the gap ends of a piston ring have been pulled together. Since the ovality $O$ is the difference between the gap diameter and the ring diameter $A$ perpendicular thereto, the measuring jaws must be applied to the two end points of these two diameters. For measuring synchronizing rings the gap measuring jaw must be provided with a gap guide because of the spread-out configuration of the gap of these rings. For measuring piston rings the gap measuring jaw lies on the outer periphery of the closed ring gap. It is part of the operating conditions for such measuring instruments that the values $A$ and $O$ be indicated and read off separately.

Previously, the dimensions $A$ and $O$ were measured consecutively on a measuring table having a measuring axis, and $O$ was determined for synchronizing rings according to the formula.

$$O = A - [(B_1 + B_2/2)];$$

wherein $B_1$ and $B_2$ are two outer diameters at the same distance from both gap ends. The previous measuring process was time-consuming and calculating errors often occurred.

SUMMARY OF THE INVENTION

It is an object of the present invention to provide a measuring instrument for measuring the outer diameter $A$ and the ovality $O$ of out-of-round objects, particularly gapped metal rings such as synchronizing rings and piston rings, by means of a fixed and a movable measuring jaw for each of the two to be measured values. The present invention is based on the realization that the values $A$ and $O$ can be mechanically coupled so that both values can be accurately determined and separately indicated in a single measuring step.

According to the present invention, a sensing tip for measuring the ovality $O$ is arranged on an inclined surface which forms an angle of 45° with respect to a slide for guiding the movable outer diameter measuring jaw, this sensing tip is guided by a member which rests on a slide for guiding the movable ovality measuring jaw. Thus, it becomes possible to simultaneously read off $A$ as well as $O$ at separate indicator devices, such as, for example, gauges. If, for example, the outer diameter $A$ increases by 0.2 mm, the 45° incline also will change by this amount and the sensing tip for the $O$ value moves out by the value $0.2/\sqrt{2}$ as calculated according to the geometric relationship. A different $O$ is indicated which corresponds to the value $A$ which has increased by 0.2mm, since the displacement in the gauge was changed. Conversely, $A$ changes when the $O$ measuring jaws indicate a value which is smaller by 0.2 mm with the inclined surface remaining stationary. The member guiding the $O$ sensing tip and the $O$ indicator device then follow by the same amount, and the sensing tip moves out again, according to the geometric relationships, by the amount of $0.2/\sqrt{2}$, so that the value $A$ also changes correspondingly. This concentrates the measurement of both values $A$ and $O$ to a single rapid and accurate process in which the above-described disadvantages of slow speed and human error sources are eliminated.

An additional simplification can be obtained with the present invention by providing, for example, lamps instead of the conventional gauges for indicating regularly occurring deviations. It is further advisable to provide a central liftoff device for the measuring jaws after the measurement is completed so that the test article can be easily removed.

DESCRIPTION OF THE PREFERRED EMBODIMENTS

Figure 1A:
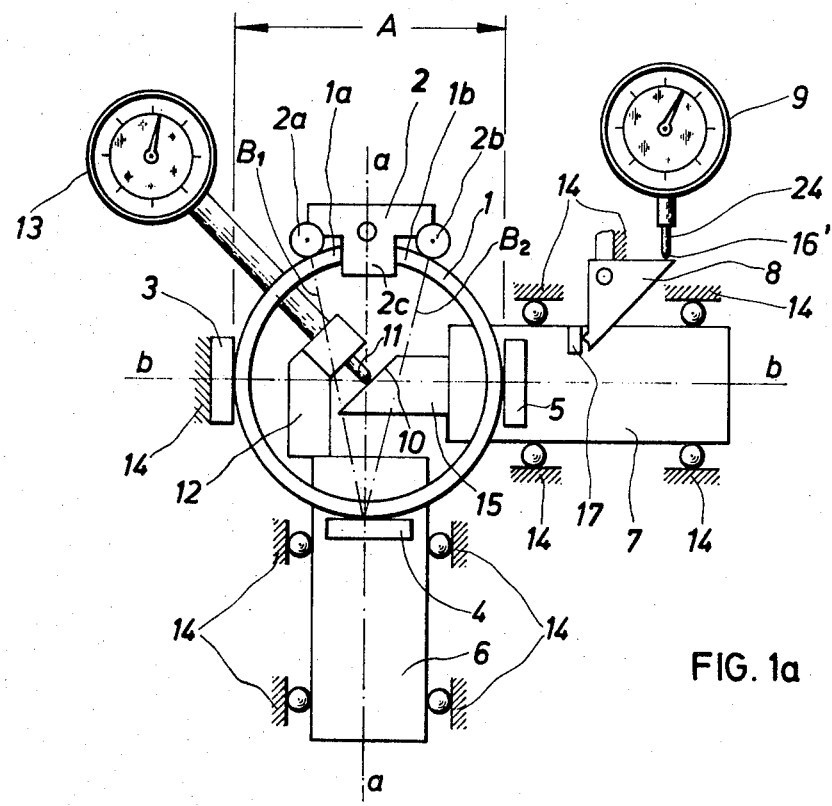
FIG. 1a is a schematic top plan view of an apparatus according to the present invention.

FIG. 1a shows an embodiment of the present invention in which an out-of-round article, such as synchronizing ring 1, is placed between measuring jaws 2,3,4, and 5. Jaws 2 and 4 serve to measure the ovality $O$ of ring 1 and are known as "$O$ measuring jaws." Jaws 3 and 5 serve to measure the outer diameter $A$ of ring 1 and are known as the "$A$ measuring jaws." Jaws 2–5 are either mounted on or guided in an instrument frame 14 shown schematically in FIGS. 1a, 1b, 1c and 4.

Jaw 2 is a pivotally mounted jaw and has rollers 2a and 2b mounted thereon in a known manner for rotation with respect thereto. Pivotally mounted jaw 2 may be mounted on frame 14 as by, for example, a pin. Rollers 2a and 2b are arranged so as to rest on the outer surface of the two gap ends 1a and 1b of ring 1 and provide point contact with respect thereto. The pivotal mounting of jaw 2 permit rollers 2a and 2b to adjust exactly to the contour of the surface of ring 1. Jaw 2 is provided with a gap guide 2c which is arranged to extend outwardly from jaw 2 and engage in the gap defined by the gap ends 1a and 1b and maintain the gap at a predetermined dimension. Jaw 4 is a counterjaw which is mounted on a displaceable slide 6 for movement therewith. Slide 6 is arranged in frame 14 in a known manner for movement along a defined axis of movement a—a.

Jaw 3 is a fixed jaw which is mounted on frame 14 in a suitable, known manner. Jaw 5 is mounted to a displaceable slide 7 for movement therewith. Slide 7 is arranged in frame 14 to be guided along a defined axis of movement b—b which is perpendicular to axis a—a. Jaw 5 may be mounted on slide 7 in any suitable known manner. For example, suitable, known fasteners may be used, such as screw fasteners. A member 8 is pivotally mounted on frame 14 in a known manner for transmitting a position of carriage 7 to, for example, a suitable, known gauge, having a sensing rod 24. Pivotally mounted member 8 contacts the sensing tip 16 of gauge 9 and an abutment 17 rigidly mounted on slide 7 for movement therewith. A displacement of slide 7 will pivot member 8 and move the sensing tip 16. A member 15 is rigidly mounted to one end surface of slide 7 for movement therewith along axis $b—b$. Member 15 defines a surface 10 inclined 45° with respect to axis $b—b$. A suitable, known gauge 13 with sensing rod 11 is, for example, clamped into a member 12 in a known manner. Member 12 is rigidly mounted in a known manner on an end surface of slide 6 for movement therewith in a direction parallel to axis $a—a$. Gauge 13 is arranged so that sensing rod 11 is perpendicular to surface 10. By this arrangement, the scale of gauge 13 may be calibrated to show the value of the ovality $O$ directly. The scale of gauge 9 may be calibrated to show the outer diameter $A$ directly. In this manner, the two desired values are indicated simultaneously and separately by gauges 9 and 13.

Figure 1B:
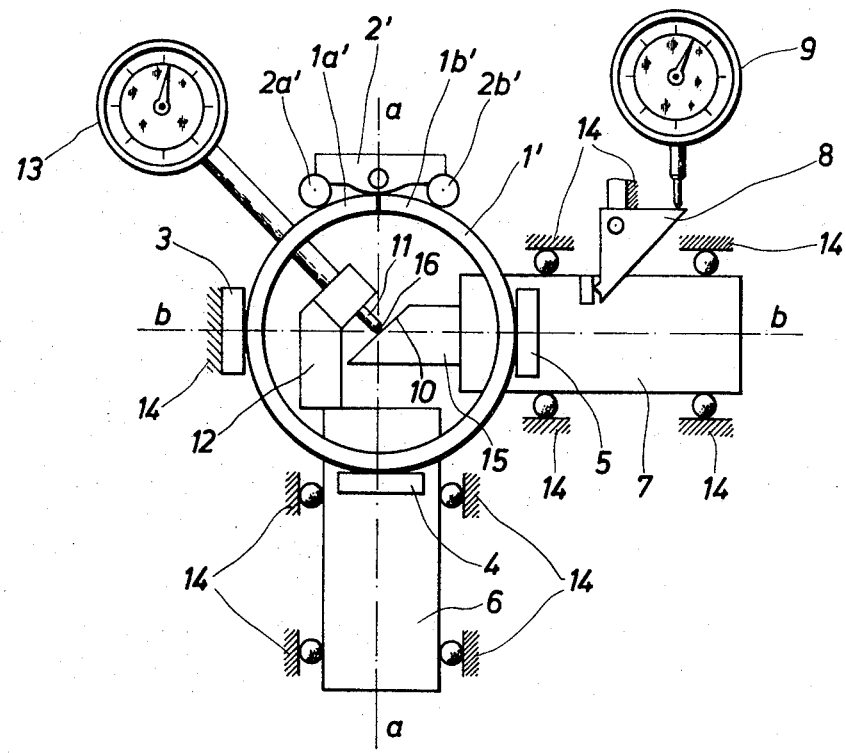
FIG. 1b is a schematic top plan view similar to FIG. 1a and showing an alternative embodiment of the present invention.

FIG. 1b shows apparatus according to the present invention having pivotally mounted jaw 2' for use in measuring an out-of-round article such as piston ring 1'. Jaw 2' has rollers 2a' and 2b' which are similar to rollers 2a and 2b of jaw 2. As can be seen from FIG. 1b of the drawings, the gap ends 1a' and 1b' of piston ring 1' are brought together by jaws 3 and 5 when the measurements are being made to eliminate the normal gap of piston ring 1'. Otherwise, the apparatus of FIG. 1b operates in an identical manner to that shown in FIG. 1a.

Figure 1C:
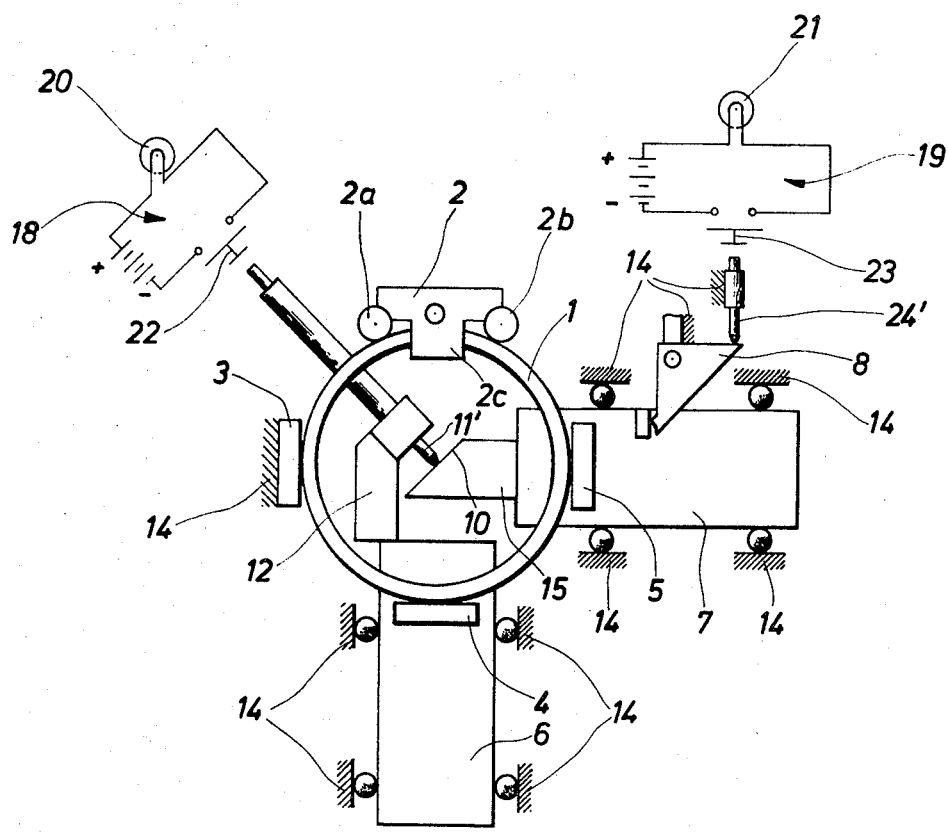
FIG. 1c is a schematic top plan view similar to FIG. 1a and showing yet another embodiment of the present invention.

FIG. 1c of the drawings shows an apparatus according to the present invention which is identical to that of FIG. 1a, except that gauges 9 and 13 have been replaced with, for example, lamp indicating devices 18 and 19. Devices 18 and 19 may be arranged in a known manner so that when a sensing rod 11' or 24' moves a predetermined distance exceeding the permissible tolerances of the article being measured, a contact 22 or 23 will be closed to complete a circuit and the appropriate lamp 20 or 21 will light up in a known manner. Thus, by the proper selection of the various parameters, any articles that light-up the lamp in either of the devices 18 and 19 will be rejected. Otherwise, the apparatus of FIG. 1c operates in the same manner as that of FIG. 1a.

Figures 2, 3:
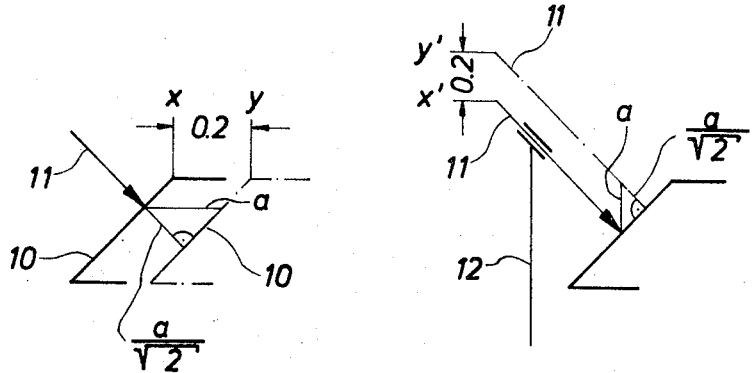
FIG. 2 is a schematic representation showing two different positions of an inclined surface according to the present invention.
FIG. 3 is a schematic representation showing two positions of the inclined surface shown in FIG. 2 but in a different measurement position.

FIG. 2 schematically shows two different positions for surface 10 which may occur for example, because of changes in dimension $A$. If dimension $A$ for a particular ring 1 is, for example, 0.2 mm greater than for a previous ring 1, surface 10 will move from position $x$ to position $y$ by, for example, $a = 0.2$ mm. The sensing rod 11 moves by the amount $0.2/\sqrt{2}$ so that the displacement in gauge 13 changes by $0.2/1.414 = 0.141$, and the indicated ovality $O$ is greater by this amount. When surface 10 moves from point $y$ to point $x$ — that is, when $A$ is smaller by, for example, 0.2 mm, $O$ also becomes smaller by 0.141 mm. Similarly, FIG. 3 shows two different positions for member 12 and sensing rod 11 of gauge 13 in a schematic representation of the change in ovality $O$ which is expressed in a change of the distance between the points of contact of roller 2a and a counterjaw 4 as well as roller 2b and counterjaw 4. If path $2a - 4$ equals $B_1$ (FIG. 1a) and path $2b - 4$ equals $B_2$, the ovality $O$ can be expressed by the formula $O = [(B_1 + B_2/2)]$. If, with stationary surface 10, dimension $O$ decreases by for example, $a = 0.2$ mm, member 12 and gauge 13 also move by the same amount. The sensing rod 11 moves out, when member 12 moves from point $x'$ to point $y'$ by, for example $0.2 / \sqrt{2}$, as shown in FIG. 3, so that the displacement in gauge 13 changes by $0.2/1.414 = 0.141$. The scale of the gauge 13 indicates a correspondingly greater ovality $O$. With movement in the opposite direction — that is, from point $y'$ to point $x'$ the ovality $O$ becomes smaller.

Figure 4:
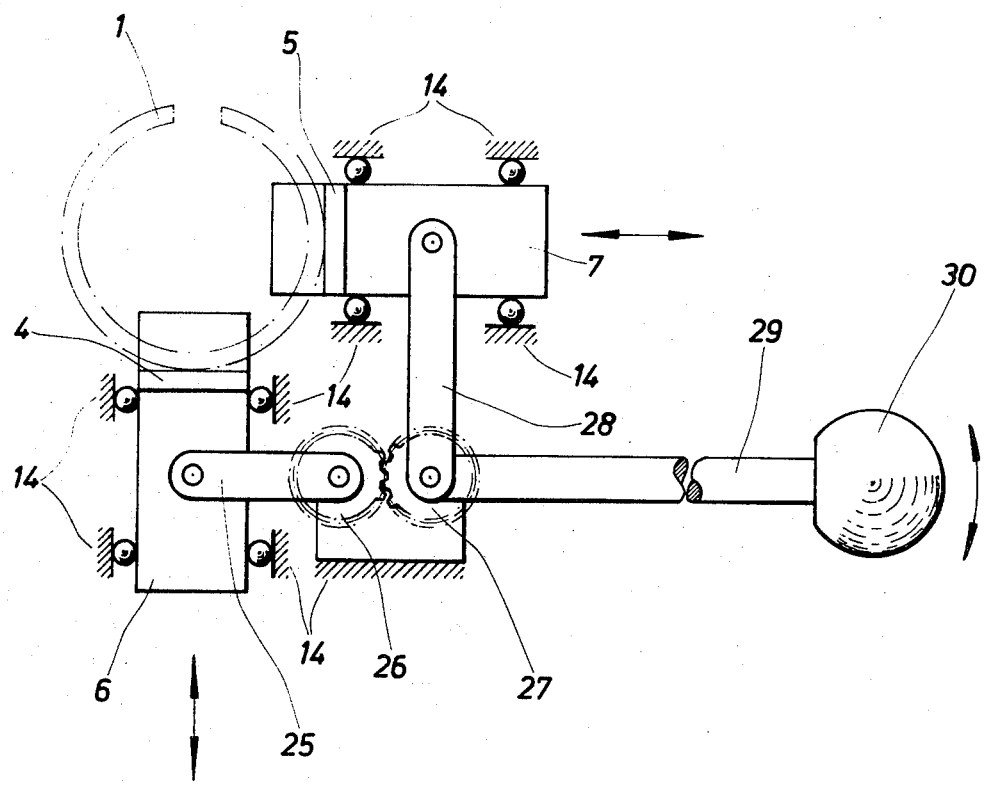
FIG. 4 is a schematic top plan view showing a central lift-off device according to the present invention.

FIG. 4 shows a central lift-off device arranged to cooperate with the displaceable slides 6 and 7 for moving the pivotally mounted jaw 2 out of contact with the synchronizing ring 1 to be measured after the measurement is completed. The slide 6 is connected, through a lever 25, to a toothed wheel 26 meshing with a toothed wheel 27 connected similarly, via a lever 28, to the slide 7. The toothed wheels 26 and 27 are also mounted on frame 14. A lever 29 ending in a knob 30 for manual actuation is connected to the lever 28 and therewith to the wheel 27. When the measurement is finished, the lever 29 is moved downwards, thereby turning the wheels 27 and 26 while at the same time moving the lever 28, the slide 7 and the jaw 5 to the right out of engagement with the ring 1. Simultaneously, the turning of the wheel 26 moves the lever 25, the slide 6 and the jaw 4 out of engagement with the ring 1.

It will be understood that the above description of the present invention is susceptible to various modifications, changes and adaptations, and the same are intended to be comprehended within the meaning and range of equivalents of the appended claims.

I claim:

1. Apparatus for measuring the outer diameter and ovality of split ring out-of-round articles, comprising in combination:

a. a frame member;

b. a first displaceable member mounted on said frame member for movement along a first axis of movement;

c. a second displaceable member mounted on said frame member for movement on a second axis different from said first axis;

d. a first abutment mounted along said first axis on said first displaceable member for movement therewith and a second abutment which is separate from said first displaceable member and is pivotally mounted on said frame member, said pivot intersecting said first axis, said second abutment and said first abutment being adapted to contact an article to be measured in the apparatus at spaced apart points along the peripheral surface thereof in the measurement of the ovality of the article;

e. a third abutment mounted along said second axis on said second displaceable member for movement therewith and a fourth abutment which is separate from said second displaceable member and is mounted on said frame member and intersecting said second axis, said third abutment and said fourth abutment being adapted to contact an article to be measured at spaced apart points along the peripheral surface thereof for measuring the outer diameter of the article;

f. a member mounted on said second displaceable member extending along said second axis of movement and defining a surface inclined 45° with respect to said second axis, and said inclined surface lying between said third and fourth abutments; and g. measuring means, having a sensing tip, mounted on said first displaceable member, said sensing tip arranged perpendicularly with respect to said inclined surface and adapted to contact said surface, said measuring means having an indicating device associated with said sensing tip whereby a reading on the indicating device is related to the ovality of the article.

2. Apparatus as defined in claim 1, further comprising another measuring means, with another indicating device and another associated sensing tip, mounted on said frame member, a pivotally mounted member on said frame member and contacted by said another sensing tip and said second displaceable member wherein a displacement of said second displaceable member is transmitted by direct contact with said pivotally mounted member to said sensing tip.

3. Apparatus as defined in claim 2, further including a fifth abutment mounted on said second displaceable member and said pivotally mounted member is contacted by said fifth abutment wherein a displacement of said second displaceable member along said second axis is transmitted by direct contact with said pivotally mounted member to said another sensing tip.

4. Apparatus as defined in claim 3, wherein said second abutment has two rollers rotatably mounted thereon to contact the peripheral surface of the article to be measured at spaced apart points.

5. Apparatus as defined in claim 4, wherein said second abutment has a projection which fits a gap defined between end portions of the split ring article to be measured.

6. Apparatus as defined in claim 4, wherein said indicating device and said another indicating device are electrically operated lamps which light up respectively when a split ring is not within settable tolerances of the ovality or diameter dimensions of the split ring size being checked.

7. Apparatus as defined in claim 4, further including a central lift-off means mounted on said frame member and arranged to cooperate with the first and second displaceable means for moving said first abutment and said third abutment into and out of contact with the article to be measured.

* * * * *